United States Patent
Yoshiura et al.

(10) Patent No.: US 11,277,388 B2
(45) Date of Patent: Mar. 15, 2022

(54) COMMUNICATION SYSTEM, COMMUNICATION METHOD, AND INFORMATION STORAGE MEDIUM

(71) Applicant: Kabushiki Kaisha Yaskawa Denki, Kitakyushu (JP)

(72) Inventors: Yasufumi Yoshiura, Kitakyushu (JP); Hirotaka Niimi, Kitakyushu (JP); Minoru Koga, Kitakyushu (JP); Toshinobu Kira, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 86 days.

(21) Appl. No.: 16/855,994

(22) Filed: Apr. 22, 2020

(65) Prior Publication Data

US 2020/0344216 A1 Oct. 29, 2020

Related U.S. Application Data

(60) Provisional application No. 62/906,734, filed on Sep. 27, 2019.

(30) Foreign Application Priority Data

Apr. 26, 2019 (JP) .............................. JP2019-085142

(51) Int. Cl.
*G06F 13/362* (2006.01)
*G06F 13/40* (2006.01)
(Continued)

(52) U.S. Cl.
CPC .......... *H04L 63/0428* (2013.01); *G05B 15/02* (2013.01); *G05B 19/41855* (2013.01);
(Continued)

(58) Field of Classification Search
CPC ......... H04L 29/06; H04L 12/403; H04L 5/00; G06F 13/40; G05B 19/418; H04W 36/00; H04W 76/11
See application file for complete search history.

(56) References Cited

U.S. PATENT DOCUMENTS

2018/0203818 A1 7/2018 Fukuda et al.
2019/0163934 A1 5/2019 Ito et al.
(Continued)

FOREIGN PATENT DOCUMENTS

EP 1035684 A2 9/2000
JP 2001053740 A 2/2001
(Continued)

OTHER PUBLICATIONS

Office Action dated Apr. 13, 2021, for corresponding JP Patent Application No. 2020-073728 with partial English translation pp. 1-7.

(Continued)

*Primary Examiner* — Iqbal Zaidi
(74) *Attorney, Agent, or Firm* — HEA Law PLLC

(57) ABSTRACT

A communication system, comprising a plurality of industrial machines configured to perform synchronous communication, wherein each of the plurality of industrial machines configured to: encrypt transmission data; transmit the encrypted transmission data to another industrial machine; receive encrypted reception data from the another industrial machine; and decrypt the encrypted reception data.

15 Claims, 9 Drawing Sheets

(51) Int. Cl.
  *H04L 12/40* (2006.01)
  *H04L 12/403* (2006.01)
  *H04L 29/06* (2006.01)
  *G05B 15/02* (2006.01)
  *G05B 19/418* (2006.01)

(52) U.S. Cl.
  CPC ........ *G06F 13/362* (2013.01); *G06F 13/4022* (2013.01); *H04L 12/403* (2013.01); *H04L 12/40104* (2013.01); *H04L 12/40169* (2013.01)

(56) References Cited

U.S. PATENT DOCUMENTS

| | | | | |
|---|---|---|---|---|
| 2019/0356759 | A1* | 11/2019 | Alkhabbaz | ............ H04L 69/161 |
| 2021/0051218 | A1* | 2/2021 | Minaburo | ............... H04L 69/04 |

FOREIGN PATENT DOCUMENTS

| | | | |
|---|---|---|---|
| JP | 2003022425 A | 1/2003 |
| JP | 2003087240 A | 3/2003 |
| JP | 2005202520 A | 7/2005 |
| JP | 2006211567 A | 8/2006 |
| JP | 2007318217 A | 12/2007 |
| JP | 2008276686 A | 11/2008 |
| JP | 2009135577 A | 6/2009 |
| JP | 2010171722 A | 8/2010 |
| JP | 2013223102 A | 10/2013 |
| JP | 2015100121 A | 5/2015 |
| JP | 2017063381 A | 3/2017 |
| WO | 8503182 A1 | 7/1985 |
| WO | 2005091581 A1 | 9/2005 |
| WO | 2014206451 A1 | 12/2014 |
| WO | 2017046916 A1 | 3/2017 |
| WO | 2017203698 A1 | 11/2017 |
| WO | 2019078343 A1 | 4/2019 |

OTHER PUBLICATIONS

Office Action dated Feb. 16, 2021, for corresponding JP Patent Application No. 2019-085142 with partial translation pp. 1-13.
Office Action dated Jun. 30, 2020, for corresponding JP Patent Application No. 2020-073728 with partial English translation.
Akira Kanaoka et, al. "Implementation of Key Generation Center for Identity-base Encryption" IEIC Technical Report, vol. 110 No. 115, pp. 133-139 Published on Jun. 24, 2010 The Institute of Electronics, Information and Communication Engineers.
Office Action dated Nov. 5, 2019, for corresponding JP application No. 2019-085142 with partial translation.
Decision of Final Rejection dated Jan. 28, 2020, for corresponding JP application No. 2019-085142 with partial translation.
Search Report dated Aug. 27, 2020, for corresponding EP Patent Application No. 20170342.8.
Office Action dated Nov. 24, 2020, for corresponding JP Patent Application No. 2020-073728 with partial English translation pp. 1-4.

* cited by examiner

FIG.3

| MODEL | ENCRYPTED COMMUNICATION | CRYPTOSYSTEM |
|---|---|---|
| MODEL X1 | AVAILABLE | DES |
| MODEL X2 | AVAILABLE | RSA·DES |
| MODEL X3 | AVAILABLE | RSA |
| MODEL X4 | UNAVAILABLE | — |
| ⋮ | ⋮ | ⋮ |

| COMMUNICATION PARTNER | ENCRYPTED COMMUNICATION | CRYPTOSYSTEM | KEY |
|---|---|---|---|
| 20A | AVAILABLE | DES | Y1 |
| 20B | AVAILABLE | DES | Y1 |
| 20C | UNAVAILABLE | — | — |
| 20D | AVAILABLE | RSA | Y2 |

| TYPE | ENCRYPTED COMMUNICATION |
|---|---|
| OPERATION WAVEFORM | REQUIRED |
| OPERATION COMMAND | REQUIRED |
| PARAMETER | REQUIRED |
| MACHINE INFORMATION | NOT REQUIRED |
| × ⋮ | × ⋮ |

| PRIORITY | CRYPTOSYSTEM |
|---|---|
| 1 | DES |
| 2 | FEAL |
| 3 | RSA |
| 4 | DSA |
| ⋮ | ⋮ |

DT4

COMMUNICATION SYSTEM, COMMUNICATION METHOD, AND INFORMATION STORAGE MEDIUM

CROSS-REFERENCE TO RELATED APPLICATION

The present disclosure contains subject matter related to that disclosed in Japanese Patent Application JP2019-085142 filed in the Japan Patent Office on Apr. 26, 2019 and Provisional Application U.S. 62/906,734 in the United States Patent Office on Sep. 27, 2019 the entire contents of which are hereby incorporated by reference.

BACKGROUND OF THE INVENTION

1. Field of the Invention

The embodiments disclosed herein relate to a communication system, a communication method, and an information storage medium.

2. Description of the Related Art

In WO2017/046916A1, it is described that, in a system including a communication master and a communication slave configured to operate in accordance with a command from the communication master, the command is transmitted from the communication master to the communication slave, and an operation result is transmitted from the communication slave to the communication master.

SUMMARY OF THE INVENTION

According to one aspect of the present invention, there is provided a communication system including a plurality of industrial machines configured to perform synchronous communication, wherein each of the plurality of industrial machines is configured to: encrypt transmission data; transmit the encrypted transmission data to another industrial machine; receive encrypted reception data from the another industrial machine; and decrypt the encrypted reception data.

BRIEF DESCRIPTION OF THE DRAWINGS

FIG. 3 is a table for showing a data storage example of model data.

FIG. 4 is a table for showing a data storage example of setting data.

FIG. 7 is a table for showing a data storage example of type data.

FIG. 9 is a table for showing a data storage example of priority data.

DESCRIPTION OF THE EMBODIMENTS

1. First Embodiment

From the viewpoints of the inventors of the present invention, in a communication system including a plurality of industrial machines capable of synchronous communication, a malicious third party may rewrite or snoop on data on a network. However, in a related-art communication system, all of the data in the communication system is exchanged in plain text, and therefore security is not sufficiently secured. As a result of extensive research and development for increasing security in the communication system including the plurality of industrial machines capable of synchronous communication, the inventors of the present invention have conceived a novel and original communication system and the like. A detailed description is now given of the communication system and the like according to a first embodiment of the present invention.

[1-1. Overall Configuration of Communication System]

Figure 1:
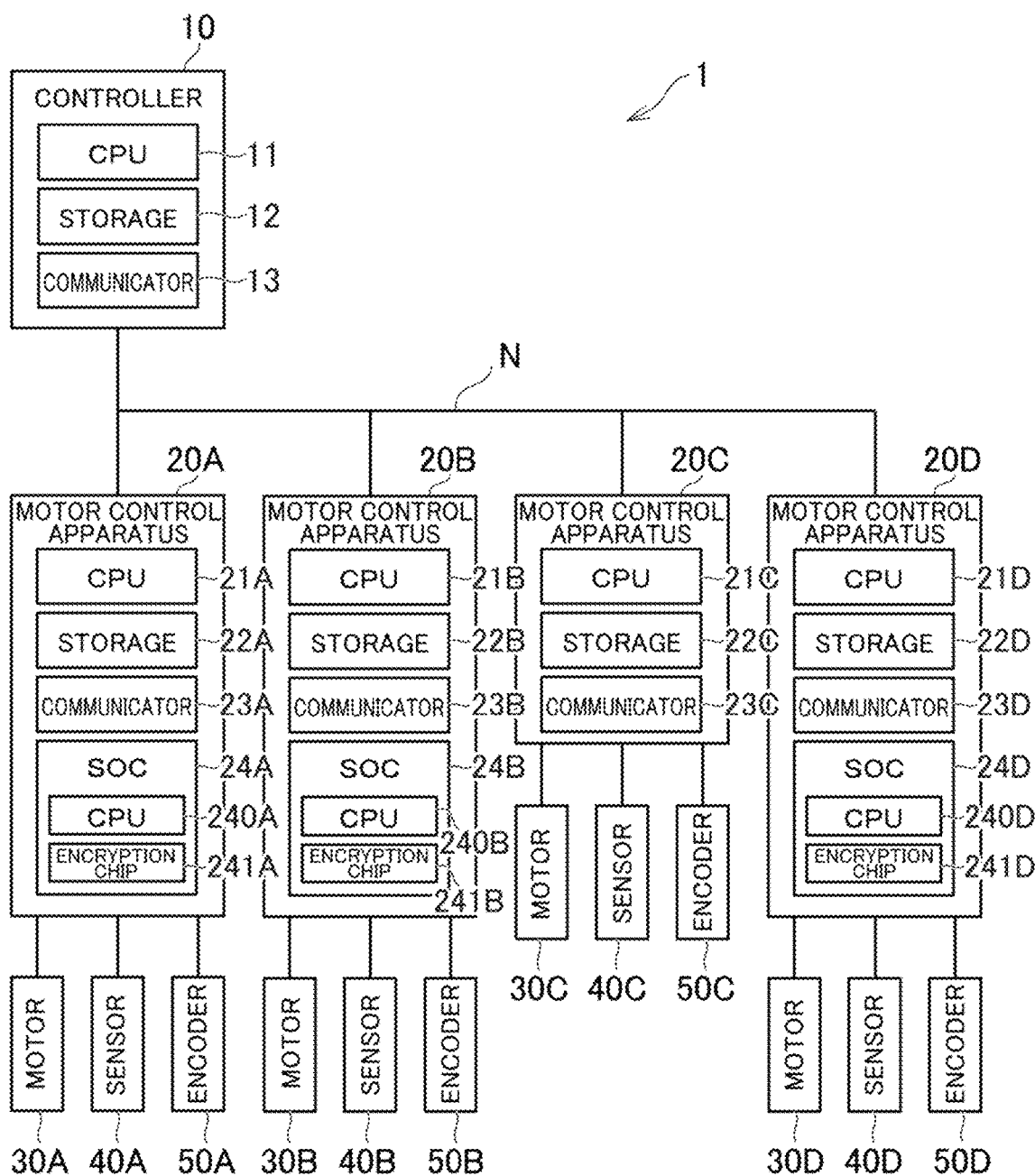
FIG. 1 is a diagram for illustrating an example of an overall configuration of a communication system according to an embodiment of the present invention.

FIG. 1 is a diagram for illustrating an example of an overall configuration of the communication system according to the first embodiment. As illustrated in FIG. 1, the communication system 1 includes a controller 10, motor control apparatus 20A to 20D, motors 30A to 30D, sensors 40A to 40D, and encoders 50A to 50D. When it is not required to particularly distinguish each of the motor control apparatus 20A to 20D, the motors 30A to 30D, the sensors 40A to 40D, and the encoders 50A to 50D, those components are simply referred to as "motor control apparatus 20", "motor 30", "sensor 40", and "encoder 50".

The controller 10 is an apparatus configured to control the motor control apparatus 20. In the first embodiment, a description is given of a case in which the controller 10 controls four motor control apparatus 20, but the controller 10 may control any number of motor control apparatus 20. For example, the controller 10 may control one, two, three, or five or more motor control apparatus 20. Moreover, for example, not only the motor control apparatus 20 but also sensors and input/output devices may be connected to the controller 10, for example. Moreover, for example, the communication system 1 may include a plurality of controllers 10.

For example, the controller 10 includes a CPU 11, a storage 12, and a communicator 13. The CPU 11 includes at least one processor. The storage 12 includes a RAM, an EEPROM, and a hard disk drive, and is configured to store various types of programs and data. The CPU 11 is configured to execute various types of processing based on those programs and data. The communicator 13 includes a network card and a communication interface, for example, various types of communication connectors, and is configured to communicate to/from other devices.

The motor control apparatus 20 is an apparatus configured to control the motor 30. The motor control apparatus 20 may also be referred to as "servo amplifier" or "servopack" (trademark). In the first embodiment, a description is given of a case in which the motor control apparatus 20 controls one motor 30, but the motor control apparatus 20 may control a plurality of motors 30. Further, not only the motor 30, the sensor 40, and the encoder 50, but also input/output devices and the like may be connected to the motor control apparatus 20. The motor control apparatus 20 is configured to control a voltage to be applied to the motor 30 connected through power lines based on the command received from the controller 10. The motor 30 may be a motor of a rotary type or a linear type.

For example, the motor control apparatus 20A includes a CPU 21A, a storage 22A, a communicator 23A, and a system on chip (SOC) 24A. The physical configuration of each of the CPU 21A, the storage 22A, and the communicator 23A is the same as that of each of the CPU 11, the storage 12, and the communicator 13.

The SOC 24A is a circuit in which functions of a specific purpose are integrated on a chip. In the first embodiment, the SOC 24A is a circuit specialized for encrypted communication, and includes, for example, a CPU 240A and an encryption chip 241A. The physical configuration of the CPU 240A is the same as that of the CPU 11, and for example, firmware for encrypted communication is loaded on the CPU 240A. The encryption chip 241A includes, for example, a memory configured to store a key, and an arithmetic circuit configured to perform calculations specialized for a specific cryptosystem. The encryption chip 241A executes encryption and decryption calculations based on the key stored in the memory in accordance with an instruction from the CPU 240A.

The SOC 24A may be installed at the time of manufacturing the motor control apparatus 20A, or the user may mount the SOC 24A after purchasing the motor control apparatus 20A. Moreover, for example, the SOC 24A may be externally mounted through use of an input/output device, for example, a USB terminal, in place of being installed in the housing of the motor control apparatus 20A. The physical configuration of the SOC 24A is not limited to the example described above, and may have any configuration capable of performing the encryption and decryption calculations. For example, the SOC 24A may include a sub-CPU in place of the encryption chip 241A, and the sub-CPU may execute the encryption and decryption calculations. Moreover, for example, the CPU 240A may execute the encryption and decryption calculations without particularly providing the encryption chip 241A.

The physical configuration of each of the motor control apparatus 20B and 20D is the same as that of each of the motor control apparatus 20A. That is, the physical configuration of each of the CPU 21B and the CPU 21D, the storage 22B and the storage 22D, the communicator 23B and the communicator 23D, and the SOC 24B and the SOC 24D are each the same as the configuration of each of the CPU 21A, the storage 22A, the communicator 23A, and the SOC 24A. The motor control apparatus 20C includes a CPU 21C, a storage 22C, and a communicator 23C. The physical configuration of each of those components is the same as that of each of the CPU 21A, the storage 22A, and the communicator 23A. However, the motor control apparatus 20C does not support encrypted communication, and does not include an SOC. In the following description, when the individual components included in the motor control apparatus 20 are not to be distinguished, the alphabetic letter at the end of the reference symbol is omitted, and the components are written, for example, as "CPU 21", "storage 22", "communicator 23", and "SOC 24".

The CPU 21 of the motor control apparatus 20 is an example of a first control circuit for controlling a machine connected to the CPU 21, and the SOC 24 is an example of a second control circuit for performing encrypted communication. The control circuit is a circuit board created in order to perform a given calculation, and may execute general-purpose processing like the CPU 21 or may be specialized for specific-purpose processing like the SOC 24. In general, the motor control apparatus 20 is often equipped with a CPU 21 having the minimum required performance in order to suppress cost. In this case, the CPU 21 may not keep up with the calculation processing of the encrypted communication (a delay may occur in the processing). Therefore, in the first embodiment, the SOC 24 is mounted on the motor control apparatus 20, but when the CPU 21 has sufficient performance, the SOC 24 may not be mounted, and the CPU 21 may execute the calculation processing of the encrypted communication.

The sensor 40 is configured to detect an operation state of the motor control apparatus 20 or the motor 30. The sensor 40 is only required to be a sensor capable of detecting a physical quantity, and is, for example, a torque sensor, a temperature sensor, a force sensor, or a motion sensor. The encoder 50 is a machine configured to detect a position or a speed of the motor 30, and is, for example, an optical or magnetic motor encoder. The encoder 50 is also a type of sensor. The motor control apparatus 20 is configured to transmit a physical quantity detected by the sensor 40 and a feedback speed detected by the encoder 50 to the controller 10 at any timing.

Programs and data described as being stored in each of the controllers 10, and the motor control apparatus 20 may be supplied through a network N, the Internet, or the like. Moreover, the hardware configurations of the controllers 10, and the motor control apparatus 20 are not limited to the above-mentioned examples, and various types of hardware can be applied. For example, a reader (for example, optical disc drive or memory card slot) configured to read a computer-readable information storage medium and an input/output device (for example, USB terminal) configured to directly connect to an external device may be included. In this case, programs and data stored in the information storage medium may be supplied through the reader or the input/output device. Moreover, for example, the controller 10 and the motor control apparatus 20 may each include an integrated circuit for a specific application (ASIC), for example, motor control. For example, regarding the SOC 24 as well, a hardware configuration of circuits such as an SOC or, a CPU and an ASIC may be set as appropriate.

[1-2. Overview of Communication System]

In the communication system 1, the controller 10 and the motor control apparatus 20 communicate to/from each other. The controller 10 and the motor control apparatus 20 are each an example of an industrial machine. Therefore, the terms "controller 10" and "motor control apparatus 20" in the first embodiment may be read as "industrial machine".

The term "industrial machine" is a general term for a machine configured to support work to be executed by a human or to perform the work in place of a human, and a peripheral machine of this machine. For example, in addition to the controller 10 and the motor control apparatus 20, a robot controller, an industrial robot, an inverter, a converter, a machine tool, or a PLC corresponds to the industrial machine.

In the first embodiment, a description is given of a case in which a master machine and a slave machine, which is configured to operate based on a command from the master machine, are included in the plurality of industrial machines performing communication. However, the industrial machines may not have a master/slave relationship. In other words, the master/slave relationship or a hierarchical relationship may not exist among the industrial machines.

The "master machine" is a machine configured to control the slave machine, and is a machine configured to transmit a command to the slave machine. In other words, the master machine is a machine configured to acquire an operation state from the slave machine. The "slave machine" is a machine configured to operate based on a command from the master machine, and is a machine to be controlled by the master machine. In other words, the slave machine is a machine configured to transmit the own operation state to the master machine. In the first embodiment, the controller 10 corresponds to the master machine, and the motor control apparatus 20 corresponds to the slave machine.

The controller 10 transmits the command to the motor control apparatus 20, and the motor control apparatus 20 controls the motor 30 based on the command. The controller 10 and the motor control apparatus 20 are connected to each other through the network N, which is a so-called "field network", and communication is executed through use of a suitable communication protocol. In the communication system 1 according to the first embodiment, the controller 10 and the motor control apparatus 20 (an example of the plurality of industrial machines) are each capable of synchronous communication.

The "synchronous communication" is such a communication method that a timing at which a machine on a transmission side transmits data and a timing at which a machine on a reception side receives the data are synchronized. In the synchronous communication, other processing is not executed in principle in a period from transmission of a request of a data communication to a reception of a response. Therefore, the machine on the transmission side transmits the data to the machine on the reception side, and then waits for the reception of the response. When the machine on the reception side receives the data from the machine on the transmission side, the machine on the reception side immediately executes processing so as to return a processing result as the response to the machine on the transmission side. When the machine on the transmission side receives the processing result, the machine on the transmission side transitions to next processing. When the synchronous communication is not executed, the communication is executed through use of asynchronous communication.

The "asynchronous communication" is such a communication method that the timing at which the machine on the transmission side transmits data and the timing at which the machine on the reception side receives the data are not synchronized. In the asynchronous communication, other processing can be executed in the period from the transmission of the request for the data communication to the reception of the response. Therefore, in the asynchronous communication, the machine on the transmission side can execute other processing in the period from the transmission of the data to the machine on the reception side to the reception of the response. Moreover, in the asynchronous communication, the machine on the reception side may not always execute the processing immediately after the reception of the data from the machine on the transmission side. The machine on the reception side postpones the execution of the processing until a predetermined condition is satisfied, or preferentially executes processing of the synchronous communication.

The statement "capable of synchronous communication" refers to a state in which a network environment and a communication protocol that can use synchronous communication is established. The controller 10 and the motor control apparatus 20 are not required to perform synchronous communication in all communication, and may use both synchronous communication and asynchronous communication, or may use a communication method other than synchronous communication. In other words, the controller 10 and the motor control apparatus 20 can use synchronous communication as the network environment and the communication protocol, but may also use another communication method without using synchronous communication.

In the first embodiment, the controller 10 and the motor control apparatus 20 can both perform encrypted communication. Encrypted communication is a communication method in which data is encrypted. Various cryptosystems may be used as the cryptosystem itself. For example, the cryptosystem may be a common key cryptosystem such as DES or FEAL, or a public key cryptosystem such as RSA or DSA. The statement "can perform encrypted communication" refers to a state in which a network environment and a communication protocol that can use encrypted communication is established. The controller 10 and the motor control apparatus 20 are not required to perform encrypted communication in all communication, and may use both encrypted communication and unencrypted communication. Unencrypted communication is a method in which encrypted communication is not used, in which communication is performed in plain text without encryption. In other words, the controller 10 and the motor control apparatus 20 can use encrypted communication as the network environment and the communication protocol, but may also use unencrypted communication.

In the first embodiment, a description is given of a case in which the controller 10 supports encrypted communication, but among the motor control apparatus 20, there exist models supporting encrypted communication and models not supporting encrypted communication. That is, the communication system 1 may include only models supporting encrypted communication, but in the first embodiment a description is given of a case in which the communication system 1 includes a mixture of models supporting encrypted communication and models not supporting encrypted communication.

For example, the motor control apparatus 20A, 20B, and 20D are models supporting encrypted communication and include the SOC 24, but the motor control apparatus 20C is a model not supporting encrypted communication and does not include the SOC 24. For this reason, the communication between the controller 10 and the motor control apparatus 20A, 20B, 20D can use encrypted communication, but the communication between the controller 10 and the motor control apparatus 20C cannot use encrypted communication, and therefore all communication is performed in plain text.

Moreover, for example, the motor control apparatus 20A, 20B, and 20D may have the same cryptosystem as each other so that only a single cryptosystem is used. However, in the first embodiment, a description is given of a case in which a mixture of a plurality of cryptosystems is included. For example, the motor control apparatus 20A and the motor control apparatus 20B perform encrypted communication to/from the controller 10 through use of DES, and the motor control apparatus 20D performs encrypted communication to/from the controller 10 through use of RSA. It is assumed that the controller 10 can handle a plurality of those cryptosystems. Further, even when the cryptosystems are the same, there may be included a mixture of cryptosystems having a different number of bits (encryption strength). For example, a mixture of 64-bit DES and 128-bit DES may be included.

As described above, in the first embodiment, through implementation of encrypted communication between the controller 10 and the motor control apparatus 20, security in the communication system 1 including the controller 10 and the motor control apparatus capable of synchronous communication is increased. The communication system 1 is now described in more detail.

[1-3. Functions to be implemented in Communication System]

Figure 2:
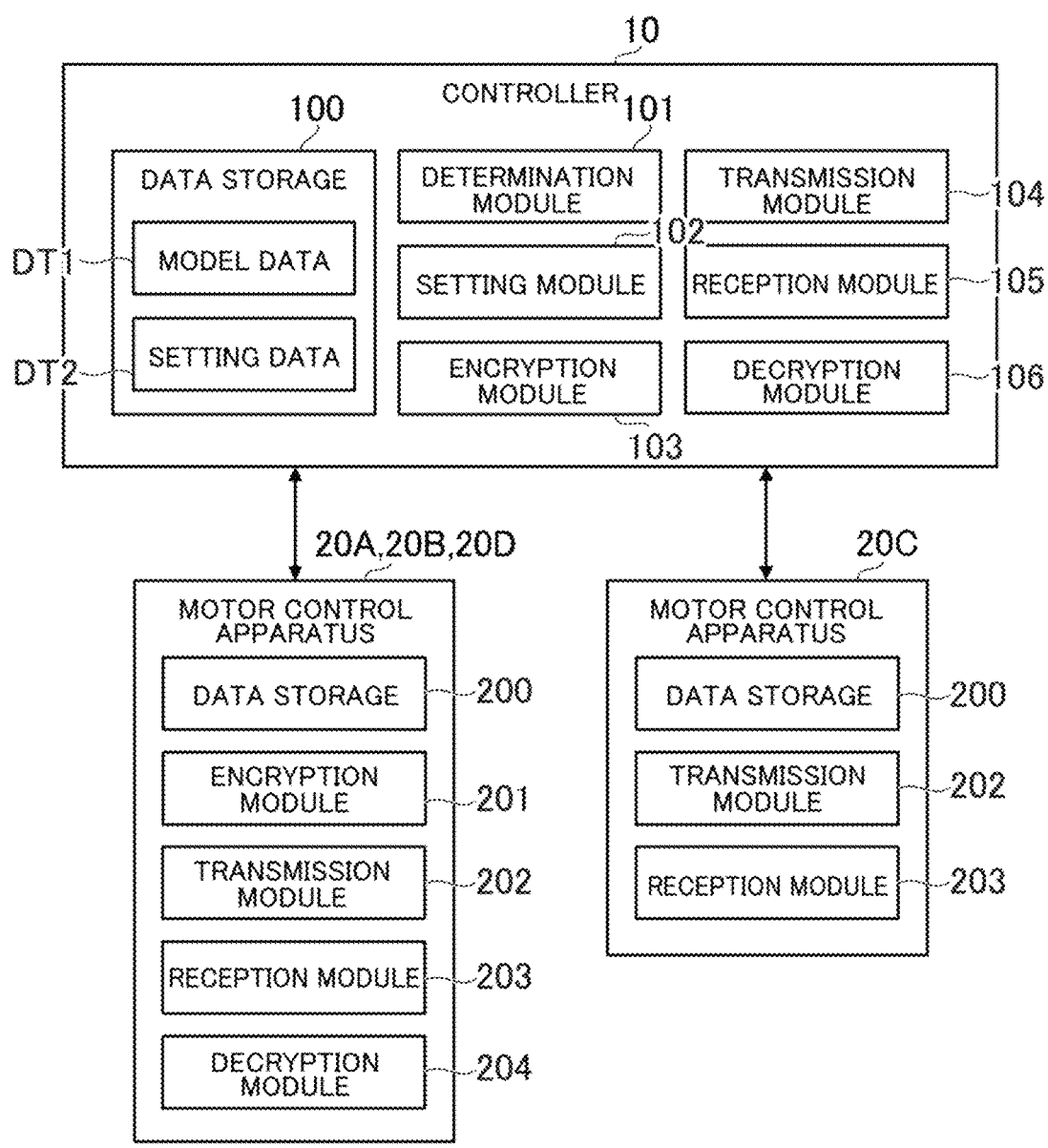
FIG. 2 is a functional block diagram for illustrating functions to be implemented in the communication system.

FIG. 2 is a functional block diagram for illustrating functions to be implemented in the communication system 1. The functions to be implemented by each of the controller 10 and the motor control apparatus 20 are now described. The motor control apparatus 20A, 20B, and 20D implement the same functions, and hence those apparatus are collectively described here with reference to FIG. 2.

[1-3-1. Functions to be Implemented in Controller]

As illustrated in FIG. 2, in the controller 10, a data storage 100, a determination module 101, a setting module 102, an encryption module 103, a transmission module 104, a reception module 105, and a decryption module 106 are implemented. The data storage 100 is implemented mainly by the storage 12. The determination module 101, the setting module 102, the encryption module 103, the transmission module 104, the reception module 105, and the decryption module 106 are implemented mainly by the CPU 11.

[Data Storage]

The data storage 100 is configured to store data required for performing communication. For example, the data storage 100 stores model data DT1 indicating a support state of the encrypted communication for each model of the motor control apparatus 20, and setting data DT2 indicating setting details of the encrypted communication for each motor control apparatus 20.

FIG. 3 is a table for showing an example of data storage of the model data DT1. As shown in FIG. 3, the model of the motor control apparatus 20, availability/unavailability of encrypted communication, and the cryptosystem are shown in the model data DT1. The "model" is the type of the motor control apparatus 20, and may be referred to as a model type or a model number. The model may be indicated by a symbol string designated by the manufacturer of the motor control apparatus 20, or may be indicated by a name given to the motor control apparatus 20.

The "availability/unavailability of encrypted communication" indicates whether or not encrypted communication can be performed. In the first embodiment, for models capable of encrypted communication, the type of supported cryptosystem is indicated, but when all models use the same encryption format, only the availability/unavailability of encrypted communication may be indicated. The model data DT1 may be downloaded from the manufacturer or may be created by the user. It is not required that the model data DT1 specifically indicate the availability/unavailability of encrypted communication, and the model data DT1 may indicate only a list of the models supporting encrypted communication. Conversely, the model data DT1 may indicate a list of models not supporting encrypted communication.

In the data storage example of FIG. 3, the model "X1" supports DES, and the model "X2" supports RSA and DES. The model "X3" supports RSA, and the model "X4" does not support encrypted communication. For example, the motor control apparatus 20A and the motor control apparatus 20B are the model "X1", and support DES. Moreover, for example, the motor control apparatus 20C is model "X4", and does not support encrypted communication. Moreover, for example, the motor control apparatus 20D is model "X3", and supports RSA.

In FIG. 3, only the cryptosystem is indicated in the model data DT1, but for example, the number of usable bits may also be indicated in the model data DT1. Moreover, for example, the model data DT1 may indicate only the model of a single manufacturer or the models of a plurality of manufacturers. Moreover, for example, not only a specific manufacturer, but a plurality of manufacturers may support encrypted communication. In this case, different pieces of model data DT1 may be provided for each manufacturer.

FIG. 4 is a table for showing a data storage example of the setting data DT2. As shown in FIG. 4, the setting data DT2 indicates, for each communication partner of the controller 10 (that is, each motor control apparatus 20), whether or not encrypted communication is to be used, the cryptosystem to be used, and a key to be used. The key is information to be used in at least one of encryption and decryption. For example, in a common key cryptosystem, the key is a common key to be used for both encryption and decryption, and in a public key cryptosystem, there is a public key to be used for encryption and a private key to be used for decryption. The key may be generated by a predetermined key generation algorithm, or may be a random symbol string input by the user.

In the data storage example of FIG. 4, it is shown that DES encrypted communication is performed between the controller 10 and the motor control apparatus 20A and 20B through use of a key "Y1". The key to be used by the motor control apparatus 20A and the key to be used by the motor control apparatus 20B may be the same or different. Moreover, for example, in the data storage example of FIG. 4, it is shown that encrypted communication is not performed between the controller 10 and the motor control apparatus 20C. Moreover, for example, it is shown that RSA encrypted communication is performed between the controller 10 and the motor control apparatus 20D through use of a key "Y2" (a set of a public key and a secret key).

In the first embodiment, a description is given of a case in which the key to be used in encrypted communication is stored in advance in the data storage 100. However, the key may be generated on the spot by using a random number or the like, and the key may be exchanged between the controller 10 and the motor control apparatus 20. The data storage 100 is configured to store at least one cryptosystem key. For example, the data storage 100 may store the key for only one given cryptosystem, or may store the key for each of a plurality of cryptosystems. Further, the data storage 100 may store at least one key for a given cryptosystem. For example, the data storage 100 may store only one key common to a plurality of communication partners, or may store a plurality of keys to be selectively used in accordance with the communication partner.

The data stored in the data storage 100 is not limited to the example described above. For example, the data storage 100 stores an encryption algorithm to be used in encrypted communication. In the first embodiment, the encryption algorithm includes an encryption calculation formula and a decryption calculation formula. The encryption calculation formula and the decryption calculation formula may be different as data. As another example, the data storage 100 may store machine information to be described later, and may store an IP address of the motor control apparatus 20. Moreover, for example, the data storage 100 may store programs or parameters in which commands for the motor control apparatus 20 are indicated in time series, and may store data such as response data and trace data received from the motor control apparatus 20.

[Determination Module]

The determination module 101 is configured to determine whether or not a network configuration of the communication system 1 has been changed. The network configuration is the configuration of the industrial machines connected to the network N (configuration of the industrial machines included in the communication system 1). The term "network configuration" may mean, for example, the industrial machines themselves, or the hardware configuration (component configuration) of the industrial machines. An example of the network configuration is the industrial machines connected to the network N. Another example of the network configuration is the hardware configuration (for example, communication interface performance or presence or absence of the SOC 24) of the industrial machines connected to the network N.

For example, the determination module 101 determines that the network configuration has been changed when an industrial machine is added, removed, or replaced. Moreover, for example, the determination module 101 determines that the network configuration has been changed when an industrial machine itself has not been added, removed, or replaced, but a hardware configuration of an industrial machine has been added, removed, or replaced (for example, when the communication interface is replaced or the SOC 24 is added).

In the first embodiment, it is assumed that when the network configuration has been changed, the user performs a predetermined change operation. For this reason, the determination module 101 determines whether or not the network configuration has been changed by determining whether or not the change operation has been performed. The change operation may be any predetermined operation performed by the user when the network configuration is changed. For example, the user connects a personal computer or the like in which an engineering tool is installed to the controller 10, and performs the change operation.

When the user performs the change operation, the fact that the change operation has been performed is recorded in the data storage 100 of the controller 10 through use of information, for example, a flag. Thus information indicates whether or not the change operation has been performed. The information becomes a first value when the change operation has been performed, and becomes a second value when the change operation has not been performed. The determination module 101 executes the determination processing by referring to the information. The determination module 101 does not determine that the network configuration has been changed when the change operation has not been performed, and determines that the network configuration has been changed when the change operation has been performed.

The determination method of the determination module 101 is not limited to the example described above, and in place of the user manually instructing a change to the network configuration, the determination module 101 may execute the determination processing by using information received from the motor control apparatus 20 connected to the network N. For example, the determination module 101 executes the determination processing based on machine information acquired at the time of configuration, power-on, or the like.

The machine information is information indicating a machine connected to the network N, and is, for example, a machine name, a model, a serial number, or an IP address. The machine information is stored in the machine connected to the network N. The machine information may indicate the hardware configuration of the machine, for example, the type or performance of the CPU 21 or the presence or absence of the SOC 24. The controller 10 records machine information acquired in the past in the data storage 100. The determination module 101 does not determine that the network configuration has been changed when the latest machine information matches the past machine information, and determines that the network configuration has been changed when the latest machine information does not match the past machine information.

Moreover, for example, a motor control apparatus 20 that has been newly added to the network N or a motor control apparatus 20 having a changed hardware configuration may spontaneously transmit a predetermined notification to the controller 10. In this case, the determination module 101 determines whether or not the network configuration has been changed by determining whether or not the predetermined notification has been received.

[Setting Module]

The setting module 102 is configured to perform setting relating to encrypted communication for each combination of industrial machines performing communication. The setting relating to encrypted communication may be performed regardless of the model, but in the first embodiment, the setting module 102 performs, for each combination of the industrial machines performing communication, setting relating to encrypted communication based on the models of the industrial machines included in the combination.

The "combination of the industrial machines performing communication" refers to a group of a plurality of industrial machines transmitting and receiving data. When communication is performed between the controller 10 and a motor control apparatus 20 as in the first embodiment, the combination of the industrial machines performing communication is a pair of industrial machines. In other words, the combination of the industrial machines performing communication is the combination of the machine transmitting the data and the machine receiving the data. In the first embodiment, communication is performed between the controller 10 as the master machine and a motor control apparatus 20 as the slave machine, and therefore the combination of the industrial machines performing communication is the combination of the master machine and the slave machine. Further, in the first embodiment, the setting module 102 is implemented by the controller 10, and therefore the setting module 102 performs setting relating to encryption for each motor control apparatus 20 that is to be a communication partner of the controller 10. The setting module 102 is not required to perform setting for all of the motor control apparatus 20 in the network N, and may perform setting for only a part of the motor control apparatus 20.

The statement "setting relating to encrypted communication" refers to at least one of setting whether encrypted communication is to be used, setting the cryptosystem to be used, and setting of the key to be used. The "setting of the cryptosystem to be used" may refer to the type of the cryptosystem to be used or the number of bits of the cryptosystem to be used. In the first embodiment, description is given of a case in which the setting module 102 performs the setting by recording in the setting data DT2 each determination result as to whether encrypted communication is to be used, the cryptosystem to be used, and the key to be used, but the setting details may be stored in other data.

In the first embodiment, there is described a case in which the model is indicated in the machine information received by the controller 10 from the motor control apparatus 20, and the setting module 102 identifies the model by referring to the machine information and performs setting relating to encrypted communication. However, the model may be acquired by any method. For example, the user may input the model of the motor control apparatus 20 by using a personal computer or the like. In this case, the setting module 102 identifies the model by referring to the model input by the user. As another example, separately from the machine information, the controller 10 may request only model information from the motor control apparatus 20.

A relationship between the model and the setting details is stored in the data storage 100. In the first embodiment, this relationship is shown in the model data DT1. This relationship may be defined in another place different from the model data DT1. For example, this relationship may be indicated as a part of a program code (algorithm), or may be indicated in the form of a mathematical expression, a table, or the like. The setting module 102 refers to the above relationship and performs setting relating to encrypted communication based on the setting details associated with the model of the motor control apparatus 20. For example, the setting module 102 refers to the model data DT1 and identifies the setting details associated with the model of the motor control apparatus 20. The setting module 102 performs setting by storing the identified setting details in the setting data DT2 in association with the motor control apparatus 20.

In the first embodiment, when it is determined that the network configuration has been changed, the setting module 102 performs setting relating to encrypted communication of the plurality of motor control apparatus 20. In other words, the setting module 102 performs setting relating to encrypted communication on condition that it is determined that the network configuration has been changed. The setting module 102 does not perform setting relating to encrypted communication when it is not determined that the network configuration has been changed, and performs setting relating to encrypted communication when it is determined that the network configuration has been changed.

The setting module 102 may perform setting relating to encrypted communication not at the time when the network configuration has been changed but at another timing. For example, the setting module 102 may perform setting at the time of power-on or at the time of configuration. Moreover, for example, the setting module 102 may perform setting when the user performs a predetermined operation from a personal computer, or may perform setting periodically when a predetermined time has arrived.

The setting module 102 may perform setting relating to encrypted communication based on information other than the information on the model of the motor control apparatus 20. For example, the setting module 102 may perform setting relating to encrypted communication based on a role, performance, or a serial number of the motor control apparatus 20. Moreover, for example, the setting module 102 may perform setting relating to encrypted communication based on a physical configuration of the motor control apparatus 20 (for example, the presence or absence of the SOC 24). As another example, the setting module 102 may perform a common setting for all of the motor control apparatus 20 regardless of the model of the motor control apparatus 20 such that the same key of the same cryptosystem is used.

[Encryption Module]

The encryption module 103 is configured to encrypt transmission data. The transmission data is, as viewed from the machine on the transmission side, the data to be transmitted. In the case of the controller 10, the transmission data is command data indicating a command to the motor control apparatus 20. The command data includes parameters such as the details of the command and the output to the motor 30. The encryption module 103 encrypts the transmission data based on a key and an encryption algorithm stored in the data storage 100. A known method may be used as the encryption method itself.

The communication system 1 of the first embodiment includes three or more industrial machines capable of synchronous communication, which may be a mixture of a combination of industrial machines using encrypted communication (for example, the controller 10 and the motor control apparatus 20A, 20B, and 20D) and a combination of industrial machines not using encrypted communication (for example, the controller 10 and the motor control apparatus 20C). Here, the statement "may be a mixture" refers to a state in which a group performing encrypted communication and a group performing unencrypted communication can be included, and it is not always required that both groups be included. For example, the encryption module 103 encrypts the transmission data when communicating to/from a motor control apparatus 20 using encrypted communication, and does not encrypt the transmission data when communicating to/from a motor control apparatus 20 not using encrypted communication.

In the first embodiment, the setting module 102 sets which motor control apparatus 20 are to use encrypted communication, and therefore the encryption module 103 identifies the motor control apparatus 20 using encrypted communication and the motor control apparatus not using encrypted communication based on the setting result of the setting module 102. For example, the encryption module 103 refers to the setting data DT2, identifies the presence or absence of encrypted communication of the motor control apparatus 20 being the transmission destination, and determines whether to encrypt the transmission data.

The communication system 1 of the first embodiment may include three or more industrial machines capable of synchronous communication, which may be a mixture of a combination of industrial machines performing encrypted communication by a first cryptosystem (for example, the controller 10, and the motor control apparatus 20A and 20B) and a combination of industrial machines performing encrypted communication by a second cryptosystem (for example, the controller 10 and the motor control apparatus 20D). Here, the statement "can be a mixture" refers to a state in which a group using the first cryptosystem and a group using the second cryptosystem can be included, and it is not always required that both groups be included. The first cryptosystem and the second cryptosystem may be any cryptosystems as long as those cryptosystems are different from each other. For example, the logic of the cryptosystem itself may be different, such as DES and RSA, or the logic of the cryptosystem itself may be the same, but the number of bits to be used may be different. For example, the encryption module 103 encrypts the transmission data based on the cryptosystem set in the motor control apparatus 20 being the transmission destination of the transmission data.

The setting module 102 sets the combination of the motor control apparatus 20, and the cryptosystem and key, and therefore the encryption module 103 identifies the cryptosystem and the key based on the setting result of the setting module 102. For example, the encryption module 103 refers to the setting data DT2, identifies the cryptosystem and the key of the motor control apparatus 20 being the transmission destination, and encrypts the transmission data based on the identified cryptosystem and key.

[Transmission Module]

The transmission module 104 is configured to transmit transmission data to another industrial machine. The another industrial machine referred to here is the industrial machine being a communication partner (industrial machine being the transmission destination of the transmission data), and in the first embodiment, is a motor control apparatus 20 transmitting a command. The transmission module 104 transmits encrypted transmission data to the motor control apparatus 20 using encrypted communication, and transmits unencrypted transmission data in plain text to the motor control apparatus 20 not using encrypted communication.

[Reception Module]

The reception module 105 is configured to receive encrypted reception data from another industrial machine. The another industrial machine referred to here is the industrial machine being a communication partner (industrial machine being the transmission source of the reception data), and in the first embodiment, is a motor control apparatus 20 that has transmitted a command. The reception data is, as viewed from the machine on the reception side, the data to be received. In the case of the controller 10, the reception data is response data indicating a response from the motor control apparatus 20. For example, the response data indicates the operation result of the motor control apparatus 20 in response to the command. The reception module 105 receives encrypted reception data from the motor control apparatus 20 using encrypted communication, and transmits plaintext reception data from the motor control apparatus 20 not using encrypted communication.

[Decryption Module]

The decryption module 106 is configured to decrypt reception data. The decryption module 106 decrypts the reception data based on a key and an encryption algorithm stored in the data storage 100. A known method may be used as the decryption method itself.

The decryption module 106 decrypts the reception data when communicating to/from a motor control apparatus 20 using encrypted communication, and does not decrypt the reception data because the data is in plain text when communicating to/from a motor control apparatus 20 not using encrypted communication. The setting module 102 sets which motor control apparatus 20 are to use encrypted communication, and therefore the encryption module 103 identifies the motor control apparatus 20 using encrypted communication and the motor control apparatus not using encrypted communication based on the setting result of the setting module 102. For example, the decryption module 106 refers to the setting data DT2, identifies the presence or absence of encrypted communication of the motor control apparatus 20 being the transmission source, and determines whether to decrypt the reception data.

In the first embodiment, a plurality of cryptosystems can be mixed, and therefore the decryption module 106 decrypts the reception data based on the cryptosystem and the key set in the motor control apparatus 20 that is the transmission source of the reception data. The setting module 102 sets the combination of the motor control apparatus 20, and the cryptosystem and key, and therefore the decryption module 106 identifies the cryptosystem and the key based on the setting result of the setting module 102. For example, the decryption module 106 refers to the setting data DT2, identifies the cryptosystem and the key of the motor control apparatus 20 being the transmission source, and decrypts the reception data based on the identified cryptosystem and key.

[1-3-2. Functions to be Implemented in Motor Control Apparatus]

As illustrated in FIG. 2, in the motor control apparatus 20A, 20B, and 20D, a data storage 200, an encryption module 201, a transmission module 202, a reception module 203, and a decryption module 204 are implemented. Meanwhile, encrypted communication is not used in the motor control apparatus 20C, and hence the encryption module 201 and the decryption module 204 are not implemented, but the data storage 200, the transmission module 202, and the reception module 203 are implemented.

The data storage 200 is implemented mainly by the storage 22 and a memory included in the SOC 24. The encryption module 201 and the decryption module 204 may be implemented mainly by the CPU 21, but in the first embodiment, are implemented mainly by the SOC 24. The transmission module 202 and the reception module 203 may be implemented mainly by the SOC 24, but in the first embodiment, the transmission module 202 and the reception module 203 are implemented mainly by the CPU 21. The SOC 24, which is an example of the second control circuit, is configured such that at least the encryption module 201 and the decryption module 204 are implemented by the SOC 24, and other components may also be implemented by the SOC 24.

[Data Storage]

The data storage 200 is configured to store data required for performing communication. For example, the data storage 200 stores the key and the encryption algorithm to be used in encrypted communication. The data storage 200 may store a plurality of keys for a given cryptosystem. When a plurality of cryptosystems are supported, the data storage 200 may store a key for each cryptosystem, or may store a key common to the plurality of cryptosystems. Further, when a plurality of cryptosystems are supported, the data storage 200 stores an encryption algorithm for each cryptosystem. The key may be stored in the data storage 200 in advance, or may be distributed by the controller 10.

The data stored in the data storage 200 is not limited to the example described above. For example, the data storage 200 may store information indicating the cryptosystem supported by the motor control apparatus 20, and may store machine information. Moreover, for example, separately from the machine information, the data storage 200 may store a serial number and model information, and may also store the IP address of the controller 10. Moreover, for example, the data storage 200 may store programs or parameters for controlling the motor 30.

[Encryption Module]

The encryption module 201 encrypts the transmission data. The transmission data referred to here is, as viewed from the controller 10, the reception data. For the motor control apparatus 20, the transmission data is a response to the motor control apparatus 20. The transmission data includes, for example, a physical quantity or the like based on detection signals from the sensor 40A and the encoder 50A, and trace data in which an operation status in time series is stored. The encryption module 201 encrypts the transmission data based on a key and an encryption algorithm stored in the data storage 200. A known method may be used as the encryption method itself.

[Transmission Module]

The transmission module 202 is configured to transmit transmission data to another industrial machine. The another industrial machine referred to here is the industrial machine being a communication partner (an industrial machine being the transmission destination of the transmission data), and in the first embodiment, is the controller 10 transmitting a response. The transmission module 202 of the motor control apparatus 20A, 20B, and 20D transmits encrypted transmission data to the controller 10, and the transmission module 202 of the motor control apparatus 20C transmits plaintext transmission data to the controller 10.

[Reception Module]

The reception module 203 is configured to receive reception data from another industrial machine. The another industrial machine referred to here is the industrial machine being a communication partner (an industrial machine being the transmission source of the reception data), and in the first embodiment, is the controller 10 transmitting a command. The reception data referred to here is, as viewed from the controller 10, the transmission data. The reception module 203 of the motor control apparatus 20A, 20B, and 20D receives encrypted reception data from the controller 10, and the reception module 203 of the motor control apparatus 20C receives plaintext reception data from the controller 10.

[Decryption Module]

The decryption module 204 is configured to decrypt the reception data. The decryption module 204 decrypts the reception data based on a key and an encryption algorithm stored in the data storage 200. A known method may be used as the decryption method itself.

[1-4. Processing to be Executed in Communication System]

Next, processing to be executed in the communication system 1 is described. As an example of processing to be executed in the communication system 1, a description is given here of configuration processing for performing setting relating to encrypted communication and motor control processing for controlling the motor 30. The processing described below is an example of processing to be executed by the functional blocks illustrated in FIG. 2.

[Configuration Processing]

Figure 5:
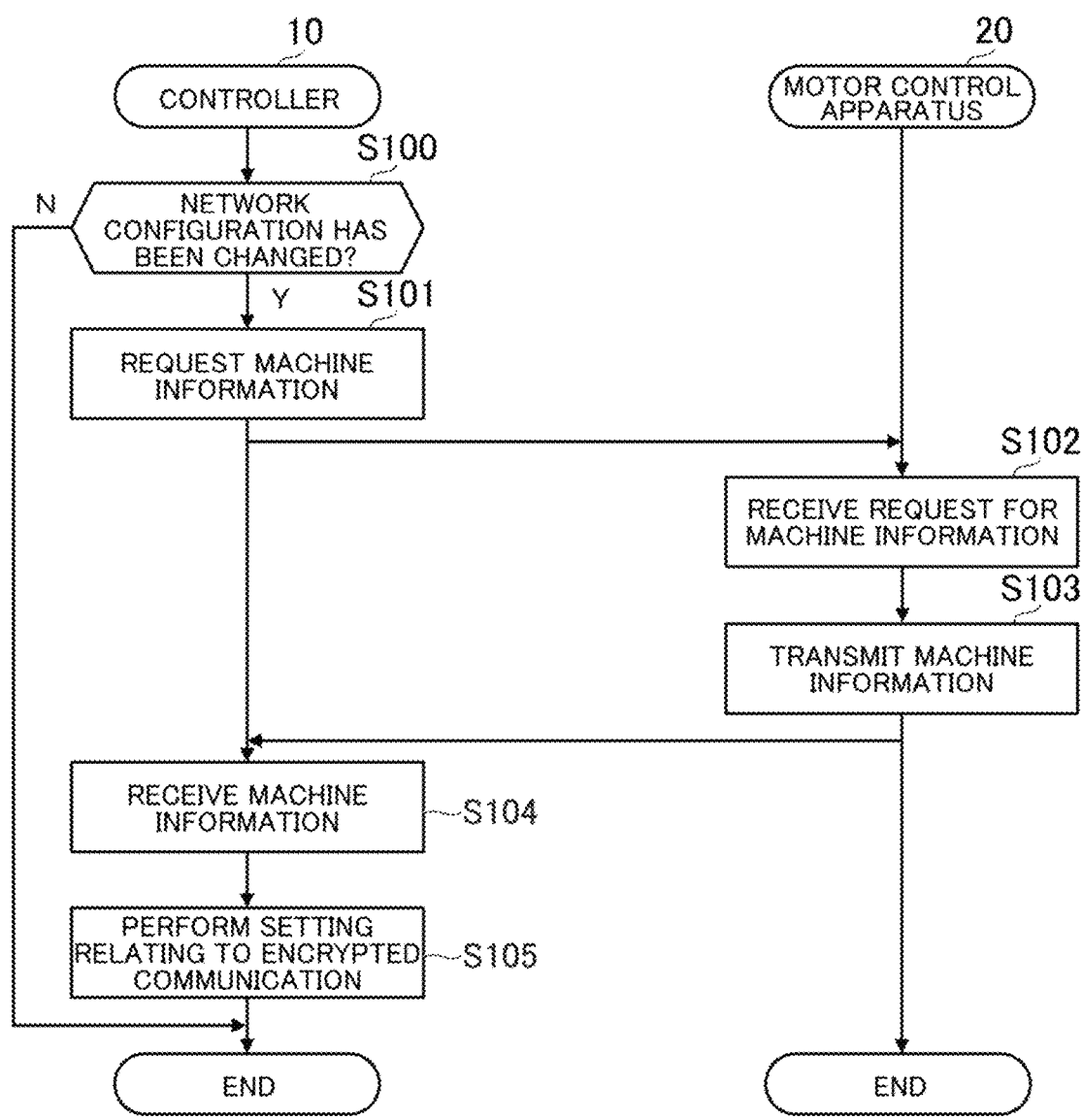
FIG. 5 is a flowchart for illustrating configuration processing.

FIG. 5 is a flowchart for illustrating configuration processing. The configuration processing is executed by the CPUs 11 and 21 operating in accordance with programs stored in the storages 12 and 22, respectively. The communication to be performed in the configuration processing may be synchronous communication or asynchronous communication.

As illustrated in FIG. 5, first, in the controller 10, the CPU 11 determines whether or not the network configuration has been changed (Step S100). The determination method regarding whether or not the network configuration has been changed is as described above. For example, the CPU 11 determines whether or not the change operation to be performed when the user changes the network configuration has been performed. Step S100 can be said to be a step of determining whether or not configuration is required to be executed.

When it is not determined that the network configuration has been changed (Step S100: N), this processing ends. In this case, it is not required to change the setting data DT2, and therefore communication between the controller 10 and the motor control apparatus 20 is performed based on the existing setting data DT2. When the setting data DT2 does not exist in the storage 12, the processing of Step S100 may be omitted and the processing of Step S101 to Step S105 may be executed.

Meanwhile, when it is determined that the network configuration has been changed (Step S100: Y), the CPU 11 requests the machine information from the entire network N (Step S101). In Step S101, the CPU 11 transmits to the broadcast addresses a command to transmit the machine information. All machines connected to the network N transmit the machine information on the own machine in response to the command, to thereby enable the controller 10 to know what machines are connected to the network N.

The motor control apparatus 20 receives the request for machine information (Step S102), and the CPU 21 transmits the machine information on the own machine to the controller 10 (Step S103). The machine information is stored in the storage 22 in advance. In Step S103, the CPU 21 reads out the machine information stored in the storage 22 and transmits the information.

The controller 10 receives the machine information from each motor control apparatus 20 (Step S104). Then, the CPU 11 performs setting relating to encrypted communication of each motor control apparatus 20 based on the machine information and the model data DT1 (Step S105), and the processing ends. In Step S105, the CPU performs setting relating to encrypted communication by identifying the machine name and the model by referring to the machine information, and storing the machine name in the setting data DT2 in association with the setting details associated with the identified model. Through execution of the processing of Step S105, whether or not encrypted communication is to be used, the cryptosystem to be used, and the key to be used are set for each motor control apparatus 20.

[Motor Control Processing]

Figure 6:
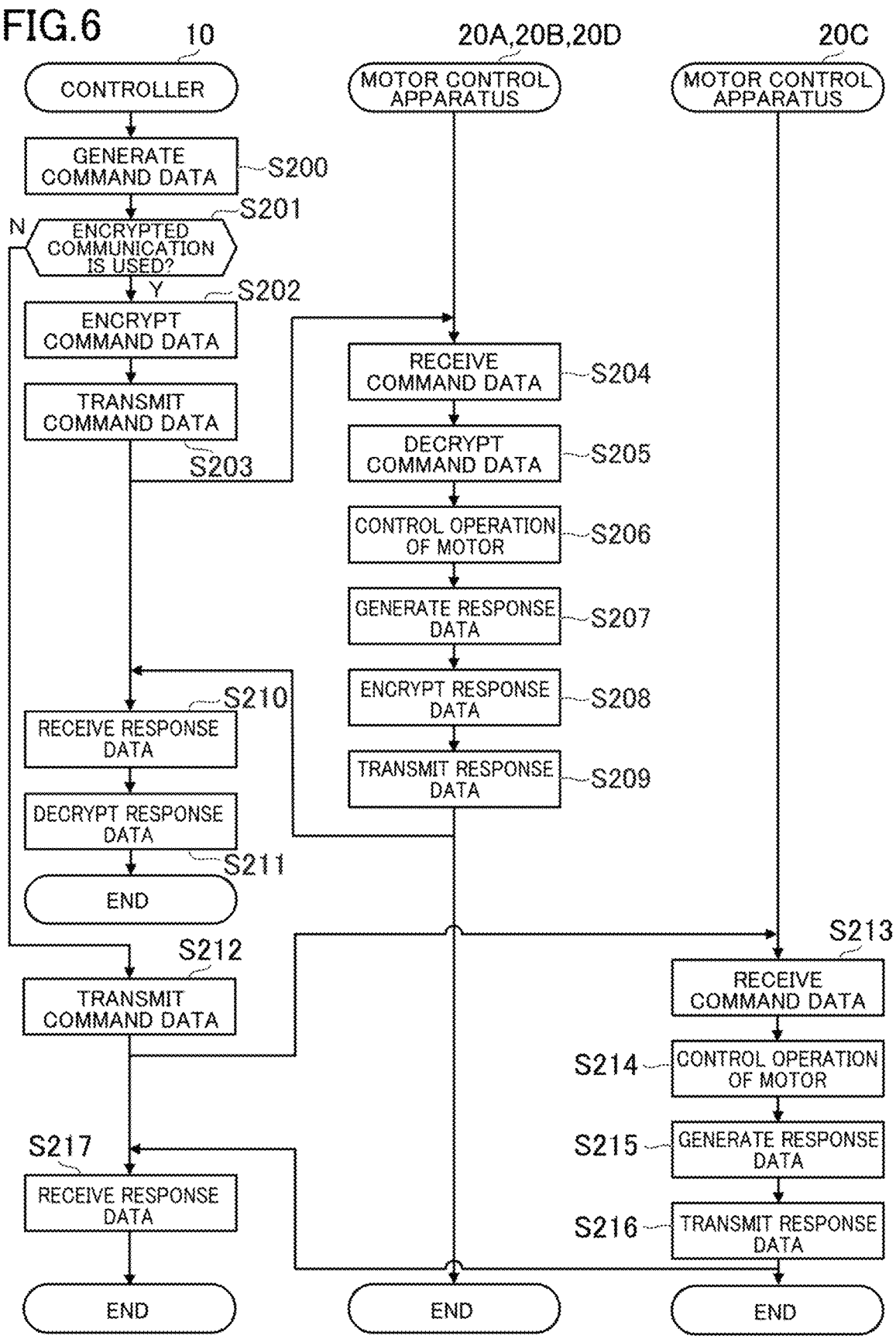
FIG. 6 is a flowchart for illustrating motor control processing.

FIG. 6 is a flowchart for illustrating motor control processing. The motor control processing is executed by the CPUs 11 and 21 operating in accordance with programs stored in the storages 12 and 22, respectively, and the SOC 24 operating in accordance with firmware stored in the SOC 24. The communication to be performed in the motor control processing may be synchronous communication or asynchronous communication.

As illustrated in FIG. 6, first, in the controller 10, the CPU 11 generates command data for the motor control apparatus 20 based on the programs and the parameters stored in the storage 12 (Step S200). The command data generated in Step S200 is transmission data as viewed from the controller 10 and reception data as viewed from the motor control apparatus 20.

The CPU 11 identifies, based on the setting data DT2 set by the configuration processing, the setting relating to encrypted communication of the motor control apparatus 20 being the transmission destination of the command data (Step S201). In Step S201, the CPU 11 refers to the setting data DT2, and acquires the setting details associated with the motor control apparatus 20 being the transmission destination. In the first embodiment, encrypted communication is performed between the controller 10 and the motor control apparatus 20A, 20B, and 20D, and therefore the processing of Step S202 to Step S211 described later is executed. Further, unencrypted communication is performed between the controller 10 and the motor control apparatus 20C, and therefore the processing of Step S212 to Step S217 described later is executed.

When the motor control apparatus 20 of the transmission destination uses encrypted communication (Step S201: encrypted communication), that is, when the transmission destination is the motor control apparatus 20A, 20B, or 20D, the CPU 11 encrypts the command data based on the setting data DT2 (Step S202). In Step S202, the CPU 11 encrypts the command data based on the cryptosystem and the key indicated by the setting data DT2. The CPU 11 transmits the command data encrypted in Step S202 to the motor control apparatus 20 being the transmission destination (Step S203).

The motor control apparatus 20A, 20B, or 20D receives the encrypted command data (Step S204), and the SOC 24 decrypts the command data (Step S205). In Step S205, the CPU 240 of the SOC 24 causes the encryption chip 241 to decrypt the command data, and acquires the decrypted command data and transmits the data to the CPU 21.

The CPU 21 controls the operation of the motor 30 based on the decrypted command data (Step S206). In Step S206, the CPU 21 controls a voltage to be output to the motor 30 based on the command data. The CPU 21 generates response data, which is a response to the command data (Step S207). In Step S207, the CPU 21 generates the response data based on detection signals from the sensor 40 and the encoder 50, and transmits the generated response data to the SOC 24.

The SOC 24 encrypts the response data generated in Step S207 (Step S208). In Step S208, the encryption chip 241B of the SOC 24 encrypts the response data based on the key stored in the encryption chip 241B. The SOC 24 transmits the response data encrypted in Step S208 to the controller 10 (Step S209).

The controller 10 receives the encrypted response data (Step S210), and the CPU 11 decrypts the response data (Step S211). In Step S211, the CPU 11 acquires the encrypted response data based on the key stored in the storage 12, and records the acquired response data in the storage 12.

Meanwhile, when the motor control apparatus 20 of the transmission destination does not use encrypted communication (Step S201: unencrypted communication), that is, when the transmission destination is the motor control apparatus 20C, the CPU 11 transmits the command data in plain text without being encrypted to the motor control apparatus 20 being the communication partner (Step S212).

The motor control apparatus 20C receives the plaintext command data (Step S213), and the CPU 21 controls the operation of the motor 30 based on the command data (Step S214). The processing of Step S214 is the same as the processing of Step S206. The subsequent processing of Step S215 and Step S216 are the same as the processing of Step S207 and Step S209. The response data generated in Step S215 is transmitted in Step S216 in plaintext without being encrypted. The controller 10 receives the plaintext response data (Step S217). The received response data is recorded in the storage 12.

According to the communication system 1 of the first embodiment, in the communication system 1 including a plurality of industrial machines capable of synchronous communication, the plurality of industrial machines performing communication encrypt and transmit transmission data, and decrypt reception data, to thereby prevent the transmission data and the reception data from being tampered with and to enable security to be increased. For example, in a case where the motor control apparatus 20 controlling the motor 30 is an industrial machine, when an operation command or an operation waveform of the motor 30 is tampered with, the motor control may be abnormal, but through prevention of tampering of the data, it is possible to prevent the motor control from being abnormal.

Further, through execution of setting relating to encrypted communication for each combination of industrial machines performing communication, flexible communication can be performed in accordance with the combination of industrial machines performing communication. For example, when the combination of industrial machines performing communication includes an industrial machine not supporting encrypted communication, encrypted communication is not performed, to thereby prevent operation of the industrial machine from being hindered because the industrial machine that does not support encrypted communication cannot perform decryption. Moreover, for example, when the strength of encrypted communication (the calculation amount of encryption and decryption) is changed in accordance with the performance of the industrial machines included in the combination of industrial machines performing communication, improved security corresponding to the performance, a reduced processing load, and improved processing speed can be achieved. Moreover, for example, when the industrial machines included in the combination of industrial machines performing encrypted communication are configured to perform encrypted communication that can be used by those industrial machines, encryption and decryption can be reliably performed, which enables hindrances in the operation of the industrial machines to be prevented.

Moreover, through execution of, for each combination of industrial machines performing communication, setting relating to encrypted communication based on the model of the industrial machines included in the combination, flexible communication can be performed in accordance with the model. For example, when the combination of industrial machines performing communication includes an industrial machine of a model not supporting encrypted communication, encrypted communication is not performed, to thereby prevent operation of the industrial machine from being hindered because the industrial machine is a model that does not support encrypted communication and cannot perform decryption. Moreover, for example, when the strength of encrypted communication (the calculation amount of encryption and decryption) is changed in accordance with the performance of the model of the industrial machines included in the combination of industrial machines performing communication, improved security corresponding to the performance of the model, a reduced processing load, and improved processing speed can be achieved. Moreover, for example, when the industrial machines included in the combination of industrial machines performing communication is configured to perform encrypted communication by a cryptosystem that can be used by the model of those industrial machines, encryption and decryption can be reliably performed, which enables hindrances in the operation of the industrial machines of a specific model to be prevented.

In the communication system 1, through enabling a combination of industrial machines using encrypted communication and a combination of industrial machines not using encrypted communication to be mixed, communication that is more flexible can be performed. For example, in a case where industrial machines that can support encrypted communication and industrial machines not supporting encrypted communication are mixed, when an attempt is made to perform encrypted communication with all of the industrial machines, the industrial machines not supporting encrypted communication cannot decrypt data, and the operation of those industrial machines may be hindered. In relation to this point, according to the communication system 1, encrypted communication is not used for the industrial machines not supporting encrypted communication, and therefore the operation of those industrial machines can be prevented from being hindered. Moreover, for the industrial machines supporting encrypted communication, security can be ensured by performing encrypted communication.

Further, in the communication system 1, through enabling a combination of industrial machines performing encrypted communication by a first cryptosystem and a combination of industrial machines performing encrypted communication by a second cryptosystem to be mixed, communication that is more flexible can be performed. For example, when industrial machines having different performances are mixed, an attempt to perform high-strength encrypted communication with all of the industrial machines may result in an increase in processing load on the industrial machines having a low performance, which may hinder operation. In relation to this, according to the communication system 1, a high-strength cryptosystem having a large calculation amount may be used for the industrial machines having a high performance, and a low-strength cryptosystem having a small calculation amount may be used for the industrial machines having a low performance. As a result, the processing load on the industrial machine can be reduced while increasing security.

Moreover, through implementation of at least the encryption module and the decryption module by the second control circuit (for example, the SOC 24) for performing encrypted communication provided separately from the first control circuit (for example, the CPU 21) for controlling the machine connected thereto, the first control circuit is not required to be used for encryption and decryption, which enables the processing load to be reduced. For example, when the second control circuit is externally connected to the industrial machine, encrypted communication can be supported even without incorporating the second control circuit into the industrial machine.

Moreover, when it is determined that the network configuration of the communication system 1 has been changed, through execution of setting relating to encrypted communication of a plurality of industrial machines, encrypted communication in accordance with the latest network configuration can be provided, and security can be effectively increased.

Moreover, security can be improved when the master machine and the slave machine communicate.

2. Second Embodiment

In the first embodiment, a description is given of a case in which the presence or absence of encrypted communication and the cryptosystem are determined in accordance with the model of the motor control apparatus 20. However, in the communication system 1, there may be data requiring encrypted communication and data not requiring encrypted communication. Therefore, the determination of the presence or absence of encrypted communication and the determination of the cryptosystem may also be performed in accordance with the type of the data. There is now given a description of a second embodiment of the present invention, which is another embodiment of the communication system 1. In the second embodiment, a description of the components that are the same as those in the first embodiment is omitted.

In the second embodiment, the data storage 100 of the controller stores type data DT3 indicating whether or not encrypted communication is required for each type of data. FIG. 7 is a table for showing a data storage example of the type data DT3. As shown in FIG. 7, the type data DT3 indicates the type of the data and whether or not encrypted communication is required. The relationship between those items may be defined in another place different from the type data DT3. For example, this relationship may be indicated as a part of a program code (algorithm), or may be indicated in the form of a mathematical expression, a table, or the like. In the type data DT3, the cryptosystem and the key may also be indicated for each type of data.

In the data storage example of FIG. 7, encrypted communication is required for the operation waveform, the operation command, and the parameters because if those pieces of data are snooped on or tampered with, the knowledge of the user may leak or the operation of the motor control apparatus 20 may be hindered. Meanwhile, encrypted communication is not required for the machine information, because there is not much adverse impact even if such information is snooped on or tampered with. The data storage 200 of the motor control apparatus 20 also stores the same type data DT3.

The encryption module 103 of the controller 10 encrypts the transmission data based on the type of the transmission data. In the second embodiment, the encryption module 103 encrypts the transmission data based on the type data DT3 and the type of the transmission data. For example, the encryption module 103 determines whether or not to encrypt the transmission data based on the type of the transmission data. Moreover, for example, the encryption module 103 determines the cryptosystem of the transmission data based on the type of the transmission data. Moreover, for example, the encryption module 103 determines the key to be used for encrypting the transmission data based on the type of the transmission data. The encryption module 201 of the motor control apparatus 20 encrypts the transmission data based on the type of the transmission data in the same manner as in the encryption module 103.

The decryption module 106 of the controller 10 decrypts the reception data based on the type of the reception data. In the second embodiment, the decryption module 106 decrypts the reception data based on the type data DT3 and the type of the reception data. For example, the decryption module 106 determines whether or not to decrypt the reception data based on the type of the reception data. Moreover, for example, the decryption module 106 determines the cryptosystem of the reception data based on the type of the reception data. Moreover, for example, the decryption module 106 determines the key to be used for decrypting the reception data based on the type of the reception data. The decryption module 204 of the motor control apparatus 20 decrypts the reception data based on the type of the reception data in the same manner as in the decryption module 106.

In the second embodiment, the motor control processing is executed based on the same flow as that of FIG. 6, but when the command data is generated in Step S200, the CPU 11 determines whether or not the data is to be encrypted based on the type of the command data. When it is determined that the data is to be encrypted, the processing advances to Step S201, and the command data is encrypted and transmitted. When it is not determined that the data is to be encrypted, the processing advances to Step S212, and the command data is transmitted in plain text.

When the response data is generated in Step S207 or Step S215, the CPU 21 determines, based on the type of the response data, whether or not the data is to be encrypted. When it is determined that the data is to be encrypted, the processing of Step S208 or Step S216 is executed, and the response data is encrypted and transmitted. When it is not determined that the data is to be encrypted, the processing of Step S208 or Step S216 is not performed, and the response data is transmitted in plain text.

According to the communication system 1 of the second embodiment, through encryption of the transmission data based on the type of the transmission data and decryption of the reception data based on the type of the reception data, encryption and decryption can be performed in accordance with the type of data, to thereby enable flexible communication in accordance with the model. A degree of importance of the data may differ depending on the type of data, for example. Important data may be required to be encrypted, and less important data may not be required to be encrypted in the first place. In this regard, through encryption of only important data, it is not required to encrypt and decrypt less important data, which enables the processing load on the industrial machine to be reduced. Moreover, for example, even in cases of encrypting all the data, through encryption of important data by a strong cryptosystem and encryption of less important data by a weak cryptosystem, it is not required to use a strong cryptosystem involving complicated calculations for all the data. Thus, the processing load on the industrial machine can be reduced, and the processing speed can be improved.

3. Third Embodiment

In the first embodiment and the second embodiment, a description is given of a case in which the presence or absence of encrypted communication and the cryptosystem are determined in accordance with the model of the motor control apparatus 20 and the type of data. However, the determination of the presence or absence of encrypted communication and the determination of the cryptosystem may also be performed based on whether or not synchronous communication is to be used. There is now given a description of a third embodiment of the present invention, which is another embodiment of the communication system 1. In the third embodiment, a description of the components that are the same as those in the first embodiment and the second embodiment is omitted.

The encryption module 103 of the controller 10 encrypts the transmission data based on whether or not synchronous communication is to be used. Whether or not synchronous communication is to be used is written in a program for executing the motor control processing and the configuration processing, for example. Before the transmission data is generated and transmitted, the encryption module 103 determines whether or not the transmission data is to be transmitted by synchronous communication. For example, the encryption module 103 encrypts the transmission data when the transmission data is to be transmitted by synchronous communication, and does not encrypt the transmission data when the transmission data is not to be transmitted by synchronous communication. Conversely, the encryption module 103 may not encrypt the transmission data when the transmission data is to be transmitted by synchronous communication, and may encrypt the transmission data when the transmission data is not to be transmitted by synchronous communication. The encryption module 201 of the motor control apparatus 20 also encrypts the transmission data in the same manner as in the encryption module 103 based on whether or not synchronous communication is to be used.

The decryption module 106 of the controller 10 decrypts the reception data based on whether or not synchronous communication is to be used. Before or after the reception data is generated and received, the decryption module 106 determines whether or not the reception data is to be received by synchronous communication. For example, the decryption module 106 decrypts the reception data when the reception data is to be received by synchronous communication, and does not decrypt the reception data when the reception data is not to be received by synchronous communication. Conversely, the decryption module 106 may not decrypt the reception data when the reception data is to be received by synchronous communication, and may decrypt the reception data when the reception data is not to be received by synchronous communication. The decryption module 204 of the motor control apparatus 20 also decrypts the reception data in the same manner as in the decryption module 106 based on whether or not synchronous communication is to be used.

In the third embodiment, the motor control processing is executed based on the same flow as that of FIG. 6, but when the command data is generated in Step S200, the CPU 11 determines whether or not the command data is to be transmitted by synchronous communication. For example, when it is determined that the command data is to be transmitted by synchronous communication, the processing advances to Step S201, and the command data is encrypted and transmitted. Meanwhile, when it is not determined that the command data is to be transmitted by synchronous communication, the processing advances to Step S212, and the command data is transmitted in plain text.

When the response data is generated in Step S207 or Step S215, the CPU 21 determines whether the response data is to be transmitted by synchronous communication based on the type of the response data. For example, when it is determined that the response data is to be transmitted by synchronous communication, the processing of Step S208 or Step S216 is executed, and the response data is encrypted and transmitted. Meanwhile, when it is not determined that the command data is to be transmitted by synchronous communication, the processing of Step S208 or Step S216 is not performed, and the response data is transmitted in plain text.

Further, when it is determined that the command data is to be transmitted by synchronous communication, the processing may advance to Step S212, and the command data may be transmitted in plain text. Meanwhile, when it is not determined that the command data is to be transmitted in synchronous communication, the processing may advance to Step S201, and the command data may be encrypted and transmitted. Further, when it is determined that the response data is to be transmitted by synchronous communication, the processing of Step S208 or Step S216 may not be performed, and the response data may be transmitted in plain text. Meanwhile, when it is not determined that the command data is to be transmitted by synchronous communication, the processing of Step S208 or Step S216 may be executed, and the response data may be encrypted and transmitted.

According to the communication system 1 of the third embodiment, through execution of the encryption of the transmission data based on whether or not synchronous communication is to be used and performing the decryption of the reception data based on whether or not synchronous communication is to be used, encryption and decryption in accordance with the communication method can be performed, to thereby enable flexible communication in accordance with the communication method. For example, encryption and decryption may not be performed when synchronous communication is to be used, and encryption and decryption may be performed when asynchronous communication is to be used. Moreover, for example, when synchronous communication is to be used, a low-strength cryptosystem having a small calculation amount can be used, and when asynchronous communication is to be used, a high-strength cryptosystem having a large calculation amount can be used. In synchronous communication, no time delay is allowed when data is transmitted and received, and in a case where there is clearly no risk of data tampering, the configuration described above enables the processing load on the industrial machine to be reduced while ensuring security, and also enables a delay in the operation of the industrial machine to be prevented. Moreover, for example, opposite to the above-mentioned case, encryption and decryption may be performed when synchronous communication is to be used, and encryption and decryption may not be performed when asynchronous communication is to be used. Moreover, for example, when synchronous communication is to be used, a high-strength cryptosystem having a large calculation amount can be used, and when asynchronous communication is to be used, a low-strength cryptosystem having a small calculation amount can be used. In synchronous communication, important data that is directly linked to the operation of the machine is often exchanged. The configuration described above thus enables tampering of important data to be prevented and security to be ensured. Moreover, data that is not so important may also be exchanged in asynchronous communication, and with the configuration described above, the processing load on the industrial machine can be reduced, and delay in the operation of the industrial machine can also be prevented.

4. Modification Examples

The present invention is not limited to the embodiments described above, and can be modified suitably without departing from the spirit of the present invention.

(1) For example, the cryptosystems that can be used may differ depending on the motor control apparatus 20, and not all of those cryptosystems may be usable by the controller 10. For this reason, the cryptosystems that are usable by the controller 10 and the cryptosystems that are usable by the motor control apparatus 20 may be compared, and when those cryptosystems match, encrypted communication may be used, and when those cryptosystems do not match, encrypted communication may not be used.

Figure 8:
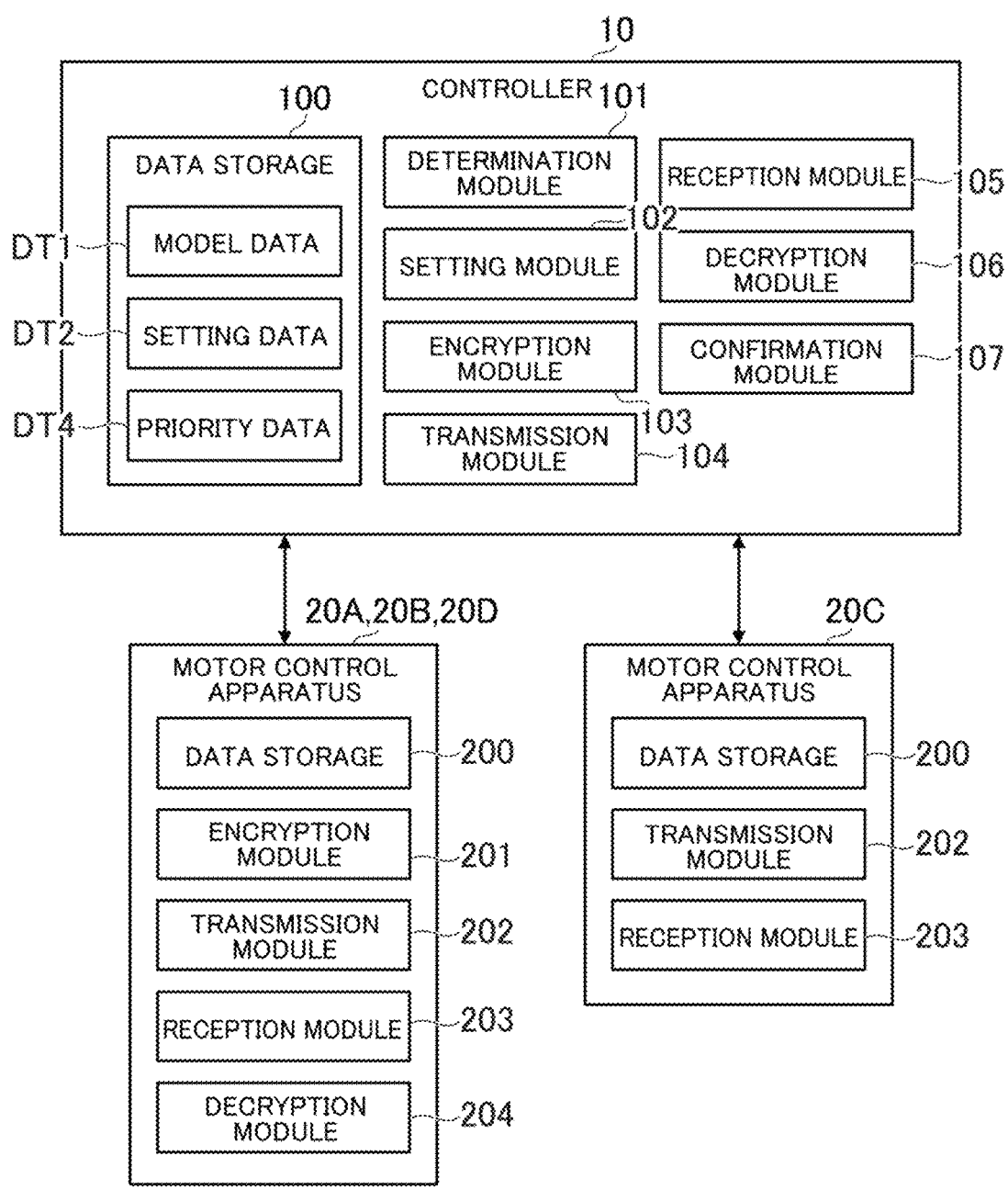
FIG. 8 is a functional block diagram in Modification Example (1) of the present invention.

FIG. 8 is a functional block diagram of Modification Example (1) of the present invention. As illustrated in FIG. 8, in Modification Example (1), a confirmation module 107 is implemented in the controller 10. The confirmation module 107 is implemented mainly by the CPU 11. In Modification Example (1), a plurality of industrial machines performing communication can use at least one cryptosystem, and the confirmation module 107 confirms the cryptosystem to be used in encrypted communication based on the cryptosystem common to the plurality of industrial machines performing communication.

The confirmation module 107 is configured to compare the cryptosystems usable by the controller 10 with the cryptosystems usable by the motor control apparatus 20, and to confirm a matching cryptosystem among those usable cryptosystems as the cryptosystem to be used in encrypted communication. When a plurality of cryptosystems match, the confirmation module 107 may select any one of those cryptosystems. The confirmation module 107 may select the cryptosystem randomly, or may select the cryptosystem based on a priority as in Modification Example (2) described later. When a plurality of cryptosystems match, the cryptosystem to be used may be selectively used in accordance with the type of data, a transmission timing of the data, and the like.

It is assumed that data indicating the cryptosystems usable by the controller 10 is stored in the data storage 100 in advance. The data indicating the cryptosystems usable by the motor control apparatus 20 may be stored in the data storage 100 in advance, or may be acquired from the motor control apparatus 20. When there is no match between the cryptosystems usable by the controller 10 and the motor control apparatus 20 (when there is no common cryptosystem), the data may be transmitted in plain text, or a predetermined alarm may be output to the user.

According to Modification Example (1) of the present invention, encrypted communication can be reliably executed by confirming, based on a cryptosystem common to a plurality of industrial machines performing communication, the cryptosystem to be used among the plurality of industrial machines.

(2) For example, in Modification Example (1), when there are a plurality of common cryptosystems that are usable by the controller 10 and the motor control apparatus 20, the cryptosystem to be used may be confirmed based on a priority of the cryptosystems. In Modification Example (2) of the present invention, the data storage 100 stores priority data DT4 indicating the priority of the cryptosystems.

FIG. 9 is a table for showing a data storage example of the priority data DT4. As shown in FIG. 9, the priority data DT4 indicates the priority of each of a plurality of cryptosystems. The priority may be any information as long as the priority of the cryptosystem can be identified. For example, the priority may be indicated by a numerical value or a symbol. In the data storage example of FIG. 9, a lower numerical value indicates a higher priority.

The confirmation module 107 in Modification Example (2) is configured to confirm, when there are a plurality of cryptosystems common to a plurality of industrial machines performing communication, a cryptosystem to be used in encrypted communication based on a priority set for each of the plurality of cryptosystems. As the cryptosystem to be used in encrypted communication, the confirmation module 107 may confirm the cryptosystem having the highest priority among the plurality of cryptosystems, or may confirm any one of the cryptosystems having a priority equal to or higher than a threshold value among the plurality of cryptosystems.

According to Modification Example (2), when there are a plurality of cryptosystems common to a plurality of industrial machines performing communication, through confirmation of the cryptosystem to be used among the plurality of industrial machines based on the priority set for each of the plurality of cryptosystems, the optimal cryptosystem in accordance with the priority can be used, and security can be effectively improved.

(3) For example, in the communication system 1, data may be exchanged in order to debug a program. When debugging is performed, the plurality of industrial machines performing communication may be configured not to perform encrypted communication. For example, the controller 10 determines whether or not the industrial machine is in a debugging mode, and when it is determined that the industrial machine is in the debugging mode, encrypted communication is not performed, and when it is determined that the industrial machine is not in the debugging mode, encrypted communication is performed. Data indicating whether or not the industrial machine is in the debugging mode may be stored in the data storage 100. For example, when performing debugging, the user connects a personal computer or the like to the controller 10 and performs an operation indicating that the debugging mode is to start. In this case, the debugging mode is started. In the debugging mode, the motor control processing illustrated in FIG. 6 is executed, but encrypted communication is not performed.

According to Modification Example (3) of the present invention, when debugging is performed, the debugging can be performed more reliably by not performing encrypted communication.

(4) Further, for example, the above-mentioned modification examples may be combined.

Further, for example, in the communication system. 1, in place of encrypting communication between the controller 10 and the motor control apparatus 20, the communication between one controller 10 and another controller 10 may be encrypted. Moreover, for example, communication between the computer 10 and a computer other than the motor control apparatus 20 (for example, a database server) may be encrypted. Moreover, for example, when communication can be performed between the motor control apparatus 20 themselves, communication between one motor control apparatus 20 and another motor control apparatus 20 may be encrypted. Moreover, for example, the determination module 101, the setting module 102, and the confirmation module 107 may be implemented not in the controller 10 but in the motor control apparatus 20, or may be implemented in another computer.

Further, the embodiments described above are given as specific examples, and are not to limit the invention disclosed herein to the very configurations and data storage examples of the specific examples. A person skilled in the art may make various modifications to the disclosed embodiments with regard to, for example, the shapes and numbers of physical components, data structures, and execution orders of processing. It is to be understood that the technical scope of the invention disclosed herein encompasses such modifications. In other words, it should be understood by those skilled in the art that various modifications, combinations, sub-combinations and alterations may occur depending on design requirements and other factors insofar as they are within the scope of the appended claims or equivalents thereof.

What is claimed is:

1. A communication system, comprising a plurality of industrial machines configured to perform synchronous communication, wherein each of the plurality of industrial machines is configured to:
   encrypt transmission data;
   transmit the encrypted transmission data to another industrial machine;
   receive encrypted reception data from the another industrial machine; and
   decrypt the encrypted reception data,
   wherein the communication system further comprises circuitry configured to perform setting relating to encrypted communication for each combination of industrial machines configured to perform communication based on a model of the industrial machines included in each combination of industrial machines.

2. The communication system according to claim 1, wherein each of the plurality of industrial machines is configured to:
   encrypt the transmission data based on a type of the transmission data, and
   decrypt the reception data based on a type of the reception data.

3. The communication system according to claim 2, wherein each of the plurality of industrial machines is configured to:
   encrypt the transmission data, and
   decrypt the reception data if the synchronous communication is to be used, or
   encrypt the transmission data and decrypt the reception data if the synchronous communication is not to be used.

4. The communication system according to claim 1, wherein each of the plurality of industrial machines is configured to:
   encrypt the transmission data, and
   decrypt the reception data if the synchronous communication is to be used, or
   encrypt the trans mission data and decrypt the reception data if the synchronous communication is not to be used.

5. The communication system according to claim 4, wherein each of the plurality of industrial machines is configured to:
   encrypt the transmission data, and
   decrypt the reception data if the synchronous communication is to be used, or
   encrypt the transmission data and decrypt the reception data if the synchronous communication is not to be used.

6. The communication system according to claim 1,
   wherein the communication system includes three or more industrial machines configured to perform synchronous communication, and
   wherein the communication system includes a combination of industrial machines configured to use encrypted communication and a combination of industrial machines configured to use unencrypted communication.

7. The communication system according to claim 1,
   wherein the communication system includes three or more industrial machines configured to perform synchronous communication, and
   wherein the communication system includes a combination of industrial machines configured to perform encrypted communication by a first cryptosystem and a combination of industrial machines configured to perform encrypted communication by a second cryptosystem.

8. The communication system according to claim 1,
   wherein each of the plurality of industrial machines configured to perform communication includes a second control circuit configured to perform encrypted communication, the second control circuit being separate from a first control circuit configured to control a machine connected to the each of the plurality of industrial machines, and
   wherein at least the encryption and the decryption are implemented by the second control circuit.

9. The communication system according to claim 1, wherein the communication system further comprises circuitry configured to:
   perform setting relating to encrypted communication if the network configuration has been changed.

10. The communication system according to claim 1, wherein the plurality of industrial machines configured to perform communication are configured to avoid performing encrypted communication when debugging is performed.

11. The communication system according to claim 1,
    wherein the plurality of industrial machines configured to perform communication include a master machine and a slave machine configured to operate based on a command from the master machine.

12. The communication system according to claim 1,
    wherein each of the plurality of industrial machines is configured to:
    encrypt the transmission data based on a type of the transmission data, and
    decrypt the reception data based on a type of the reception data.

13. A communication system comprising a plurality of industrial machines configured to perform synchronous communication, wherein each of the plurality of industrial machines is configured to:

encrypt transmission data;

transmit the encrypted transmission data to another industrial machine;

receive encrypted reception data from the another industrial machine; and decrypt the encrypted reception data, wherein the plurality of industrial machines configured to perform communication are configured to use at least one cryptosystem, wherein the communication system further comprises circuitry configured to confirm a cryptosystem to be used in encrypted communication based on a cryptosystem common to the plurality of industrial machines configured to perform communication, and wherein, when a plurality of cryptosystems common to the plurality of industrial machines are used, the circuitry confirms the cryptosystem to be used in the encrypted communication based on a priority determined for each of the plurality of cryptosystems.

14. A communication system according to claim 2 comprising a plurality of industrial machines configured to perform synchronous communication, wherein each of the plurality of industrial machines is configured to:

encrypt transmission data;

transmit the encrypted transmission data to another industrial machine;

receive encrypted reception data from the another industrial machine; and decrypt the encrypted reception data, wherein the communication system further comprises circuitry configured to perform setting relating to encrypted communication for each combination of industrial machines configured to perform communication, and wherein each of the plurality of industrial machines is configured to:

encrypt the transmission data based on a type of the transmission data, and decrypt the reception data based on a type of the reception data.

15. A communication system comprising a plurality of industrial machines configured to perform synchronous communication, wherein each of the plurality of industrial machines is configured to:

encrypt transmission data;

transmit the encrypted transmission data to another industrial machine;

receive encrypted reception data from the another industrial machine; and decrypt the encrypted reception data, wherein each of the plurality of industrial machines is configured to:

encrypt the transmission data based on a type of the transmission data, decrypt the reception data based on a type of the reception data, encrypt the transmission data, and decrypt the reception data if the synchronous communication is to be used, or encrypt the transmission data and decrypt the reception data if the synchronous communication is not to be used.

* * * * *